(12) United States Patent
Du et al.

(10) Patent No.: US 12,479,732 B2
(45) Date of Patent: Nov. 25, 2025

(54) METHOD FOR HYDROLYZING CELLULOSE INTO SUGAR TO PRODUCE SPHERICAL CAPACITIVE CARBON

(71) Applicant: GUANGXI ACADEMY OF SCIENCES, Nanning (CN)

(72) Inventors: Qishi Du, Nanning (CN); Siyu Long, Nanning (CN); Peiduo Tang, Nanning (CN); Xuequan Xian, Nanning (CN)

(73) Assignee: GUANGXI ACADEMY OF SCIENCES, Nanning (CN)

( * ) Notice: Subject to any disclaimer, the term of this patent is extended or adjusted under 35 U.S.C. 154(b) by 761 days.

(21) Appl. No.: 17/877,036

(22) Filed: Jul. 29, 2022

(65) Prior Publication Data

US 2023/0143916 A1     May 11, 2023

(30) Foreign Application Priority Data

Nov. 11, 2021    (CN) .................... 202111332258.8

(51) Int. Cl.
    *C01B 32/318*       (2017.01)
    *C01B 32/348*       (2017.01)
    *C01B 32/378*       (2017.01)
    *C01B 32/384*       (2017.01)
               (Continued)

(52) U.S. Cl.
CPC .......... *C01B 32/318* (2017.08); *C01B 32/348* (2017.08); *C01B 32/378* (2017.08); *C01B 32/384* (2017.08); *C13K 1/04* (2013.01); *H01G 11/32* (2013.01); *C01P 2004/03* (2013.01); *C01P 2004/32* (2013.01); *C01P 2004/50* (2013.01); *C01P 2006/40* (2013.01)

(58) Field of Classification Search
CPC ... C01B 32/318; C01B 32/348; C01B 32/389; C01B 32/384; C13K 1/04; H01G 22/32; C01P 2004/03; C01P 2004/32; C01P 2004/50; C01P 2006/40
See application file for complete search history.

(56) References Cited

U.S. PATENT DOCUMENTS 9,284,614 B2 * 3/2016 Fujita ................. B09B 3/00
2021/0285155 A1 * 9/2021 Tudman ................. D21B 1/34

FOREIGN PATENT DOCUMENTS

| CN | 111321182 A | * | 6/2020 | |
| CN | 113247894 A | * | 8/2021 | ........... C01B 32/324 |
| JP | 2014205596 A | * | 10/2014 | |

* cited by examiner

*Primary Examiner* — Richard M Rump
(74) *Attorney, Agent, or Firm* — RANKIN, HILL & CLARK LLP

(57) ABSTRACT

A method for hydrolyzing cellulose into sugar to produce spherical capacitive carbon for the deep utilization of biomass and carbon materials. The present disclosure includes the following steps of: (1) crude cellulose pretreatment; (2) alkaline hydrolysis of cellulose; (3) separation of the cellulose from a hydrolyzed sugar liquor; (4) drying of an alkali-containing hydrolyzed sugar; (5) sintering of spherical capacitive carbon; (6) capacitive carbon post-processing; and (7) alkali recycling. In the method, biomass is used as a raw material, high-purity cellulose and hydrolyzed sugar are obtained through deep hydrolysis, the spherical capacitive carbon is sintered with the hydrolyzed sugar instead of sucrose and starch, and alkali is recycled. Pollution and waste are not generated, and more than 80% of the alkali can be recycled.

9 Claims, 7 Drawing Sheets

(51) Int. Cl.
*C13K 1/04* (2006.01)
*H01G 11/32* (2013.01)

METHOD FOR HYDROLYZING CELLULOSE INTO SUGAR TO PRODUCE SPHERICAL CAPACITIVE CARBON

CROSS REFERENCE TO RELATED APPLICATION

This patent application claims the benefit and priority of Chinese Patent Application No. 202111332258.8, filed on Nov. 11, 2021, the disclosure of which is incorporated by reference herein in its entirety as part of the present application.

TECHNICAL FIELD

The present disclosure relates to the technical field of deep development and utilization of biomass and carbon materials, in particular to a method for hydrolyzing cellulose into sugar to produce spherical capacitive carbon.

BACKGROUND ART

Capacitive carbon is an important material for super capacitors, accounting for 35% of the cost, and determining the power density, energy density and service life of super capacitors. Super capacitors have very strict specifications for capacitive carbon, requiring high specific surface, high electrical conductivity, high tap density, fewer oxygen-containing functional groups, and fewer impurities such as iron and nickel. The spherical capacitive carbon can improve the quality of carbon electrodes in a limited space and the conductivity of electrodes due to its large contact area and high packing density, which is welcomed by super capacitors.

Usually, the spherical capacitive carbon is sintered with starch and sucrose as raw materials. On Apr. 18, 2021, the China Petroleum and Chemical Industry Federation organized experts to hold a scientific and technological achievement evaluation meeting on "Mass Preparation Technology of Activated Carbon for Starch-based Super Capacitor" in Taiyuan, The technology was completed by Shanxi Institute of Coal Chemistry, Chinese Academy of Sciences and Shanxi Meijin Energy Co., Ltd.; Shanxi Tanmei New Material Technology Co., Ltd. approved the project of the construction of a 1,000-ton/year starch-based capacitive carbon production line based on the above technology. However, both starch and sucrose are valuable foods, which are related to national food security and are impossible to be widely used to sinter capacitive carbon. Thus, other sources of raw materials have to be developed. Like starch and sucrose, cellulose is a polymer of glucose monomers, and various oligosaccharides can be obtained by deep hydrolysis of cellulose. Therefore, it is possible to replace sucrose and starch with sugar produced by the deep hydrolysis of cellulose to sinter high-purity spherical capacitive carbon.

SUMMARY

Since precious sucrose and starch need to be used as raw materials in the production of existing spherical capacitive carbon, an objective of the present disclosure is to solve the substitute of sucrose and starch raw materials. Because cellulose, like sucrose and starch, is a polymer of glucose monomers, the cellulose is the largest green renewable resource. In the present disclosure, hydrolyzed sugar and high-purity cellulose are obtained by deep hydrolysis of cellulose, and the hydrolyzed sugar is sintered into spherical capacitive carbon. Meanwhile, high-purity cellulose can be used to sinter graphitized short carbon fiber, which is an excellent soft carbon material. In addition, this technology can further be combined with the pulp industry to use a black liquor of alkali lignin to manufacture lignin-derived capacitive carbon. In this process, the alkali can be recycled, which serves as a reagent for pulp cooking and an activator of capacitive carbon. One alkali which can be used for multiple purposes has excellent environmental and ecological benefits, and can produce high social and economic benefits.

To achieve the above objective, the present disclosure adopts the following technical solution:

a method for hydrolyzing cellulose into sugar to produce spherical capacitive carbon, including the following steps:

step 1, crude cellulose pretreatment: adding a crude cellulose raw material to a dilute sulfuric acid solution to soak and stir, filtering, rinsing filter residues with clean water until neutral, and drying the filter residues to obtain cellulose;

step 2, alkaline hydrolysis of cellulose: adding the cellulose obtained in step 1 into a lye, cooking the cellulose at 120-150° C. for 6-10 h, and partly hydrolyzing the cellulose into sugar;

step 3, separation of the cellulose from a hydrolyzed sugar liquor: subjecting a hydrolysate obtained in step 2 to solid-liquid separation, washing filter residues with water and drying to obtain purified cellulose that can be used for sintering of short carbon fiber or for other purposes;

step 4, drying of an alkali-containing hydrolyzed sugar: using a filtrate separated in step 3 as an alkali-containing hydrolyzed sugar liquor, drying the alkali-containing hydrolyzed sugar liquor in an oven at 115-125° C., and grinding into powder to obtain the alkali-containing hydrolyzed sugar;

step 5, sintering of spherical capacitive carbon: supplementing the alkali-containing hydrolyzed sugar with an activator and a co-activator, grinding, stirring, and mixing evenly, heating a resulting mixture to 700-800° C. in an inert atmosphere, and carbonizing-activating for 60-90 min to form a spherical capacitive carbon agglomerate;

step 6, capacitive carbon post-processing: crushing the spherical capacitive carbon agglomerate, soaking in hot water, filtering, reserving a filtrate, pickling filter residues once and washing filter residues with water several times until neutral, drying and grinding to D50=5-8 μm to obtain a finished product of spherical capacitive carbon; and step 7, alkali recycling: drying a hot water soaked filtrate in the capacitive carbon post-processing in step 6, recovering the alkali, and recycling the alkali used in the alkaline hydrolysis of cellulose in step 2 and/or the activator in the sintering of spherical capacitive carbon in step 5.

Further, in step 1, the crude cellulose raw material may be coarse pulp produced by a pulp mill or cellulose extracted from biomass by other methods. The coarse pulp may include a variety of pulp after separation and removal of lignin, for example, pulp manufactured by the sulfate pulping (Kraft process) based on NaOH and $Na_2S$ and the soda process based on NaOH; the cellulose may be crude cellulose obtained after removal of lignin and hemicellulose from biomass by an organic solvent method.

Further, step 1 includes the following operations: adding the crude cellulose raw material to a 3-10 wt % dilute sulfuric acid solution in a solid-liquid mass ratio of 1:(3-5) to soak and stir for 6-10 h, filtering, rinsing the filter residues with clean water until neutral, and drying to obtain the cellulose. After the coarse pulp is soaked in the dilute sulfuric acid solution, residual hemicellulose is filtered, separated, and washed with water until neutral, and purer cellulose is obtained.

Further, in step 2, the cellulose may be added to a 3-5 wt % lye in a solid-liquid ratio of 1:(3-5).

Further, in step 2, the lye may be an aqueous NaOH solution.

Further, in step 5, the alkali-containing hydrolyzed sugar, the activator, and the co-activator may have a mass ratio of 1:(0.5-0.8):(0.3-0.6).

Further, the activator may include alkaline potassium and sodium salts, and the co-activator may include urea.

Further, the potassium salt may be potassium carbonate, and the sodium salt may be sodium carbonate.

The technical principle of a process route of the present disclosure is as follows:

It is found through the research of the present disclosure that polymers of glucose monomers, such as starch and sucrose, can be used as precursors to sinter micro- or nano-scale spherical carbon materials. In addition, glucose ($C_6H_{12}O_6$) is a monomer of 6 carbon atoms, and a macromolecular polymer thereof belongs to carbohydrate $(CH_1H_{10}O_5)_n$. When the carbohydrate undergo dehydration and carbonization at high temperature, the six carbon atom units of the glucose are rearranged into a benzene ring structure, and a benzene ring unit $(C_6)_n$ undergoes graphitization and combination at high temperature to form fullerene-like carbon spheres.

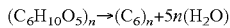

$$(C_6H_{10}O_5)_n \rightarrow (C_6)_n + 5n(H_2O)$$

Cellulose is the world's largest green and renewable resource. Like starch and sucrose, the cellulose is a macromolecular polymer of the glucose, which can be hydrolyzed into oligosaccharides of various molecular weights in an acidic or alkaline environment. Through the experiments of the present disclosure, it is found that cellulose hydrolyzed sugar can further produce spherical carbon materials during carbonization. According to the above findings, the present disclosure first purifies a coarse pulp into pure cellulose, hydrolyzes the pure cellulose in a lye, partially hydrolyzes the cellulose into sugar, and uses an alkali-containing hydrolyzed sugar to sinter the spherical capacitive carbon, where the alkali acts as an activator and can be recycled. At the same time, high-purity cellulose produced by partial hydrolysis of cellulose can be used as a raw material to further sinter a graphitized short carbon fiber. In the technical solution of the present disclosure, both precursor cellulose and hydrolyzed sugar of a carbon product are highly purified, and the resulting spherical capacitive carbon and short carbon fiber have a high carbon ratio, few impurities and high purity.

The cellulose is the largest green renewable biomass resource. The present disclosure uses a cellulose hydrolyzed sugar to replace the starch and the sucrose to produce the spherical capacitive carbon, which reduces production cost, prolongs an industrial chain, improves economic benefits, and will certainly create significant environmental, ecological and social benefits.

The present disclosure has the following beneficial effects:

First, the only product of the traditional pulping industry is pulp, the present disclosure uses the method of deep hydrolysis of pulp to convert cellulose into hydrolyzed sugar and high-purity cellulose, manufactures spherical capacitive carbon, obtains products with high added value, and prolongs the industrial chain.

Second, traditional raw materials for producing spherical capacitive carbon are sucrose and starch. The present disclosure uses cellulose hydrolyzed sugar to produce the spherical capacitive carbon, which not only reduces costs, but also saves precious sucrose and starch and is beneficial to national food security.

Third, after the cellulose in the present disclosure is deeply hydrolyzed in the lye, the hydrolyzed sugar produced is dried together with the lye to form a structure of "internal soaking and outer coating"; the alkali used for hydrolysis is further used as an activator for capacitive carbon, and one alkali achieves dual purposes, improving the quality of the capacitor carbon and reducing production costs.

Fourth, in the present disclosure, when using hydrolyzed sugar to sinter capacitive carbon, an additional activator is an alkaline potassium or sodium salt, such as $Na_2CO_3$ or $K_2CO_3$, which is not corrosive to equipment, does not pollute the environment, does not harm personnel, and can be recycled.

Fifth, the spherical capacitive carbon produced by using cellulose hydrolyzed sugar in the present disclosure has large contact area, high packing density, high carbon purity, few impurities and high electrical conductivity.

DETAILED DESCRIPTION OF THE EMBODIMENTS

The technical route and operational details of the present disclosure will be further described below with reference to specific examples and drawings.

Figure 1:
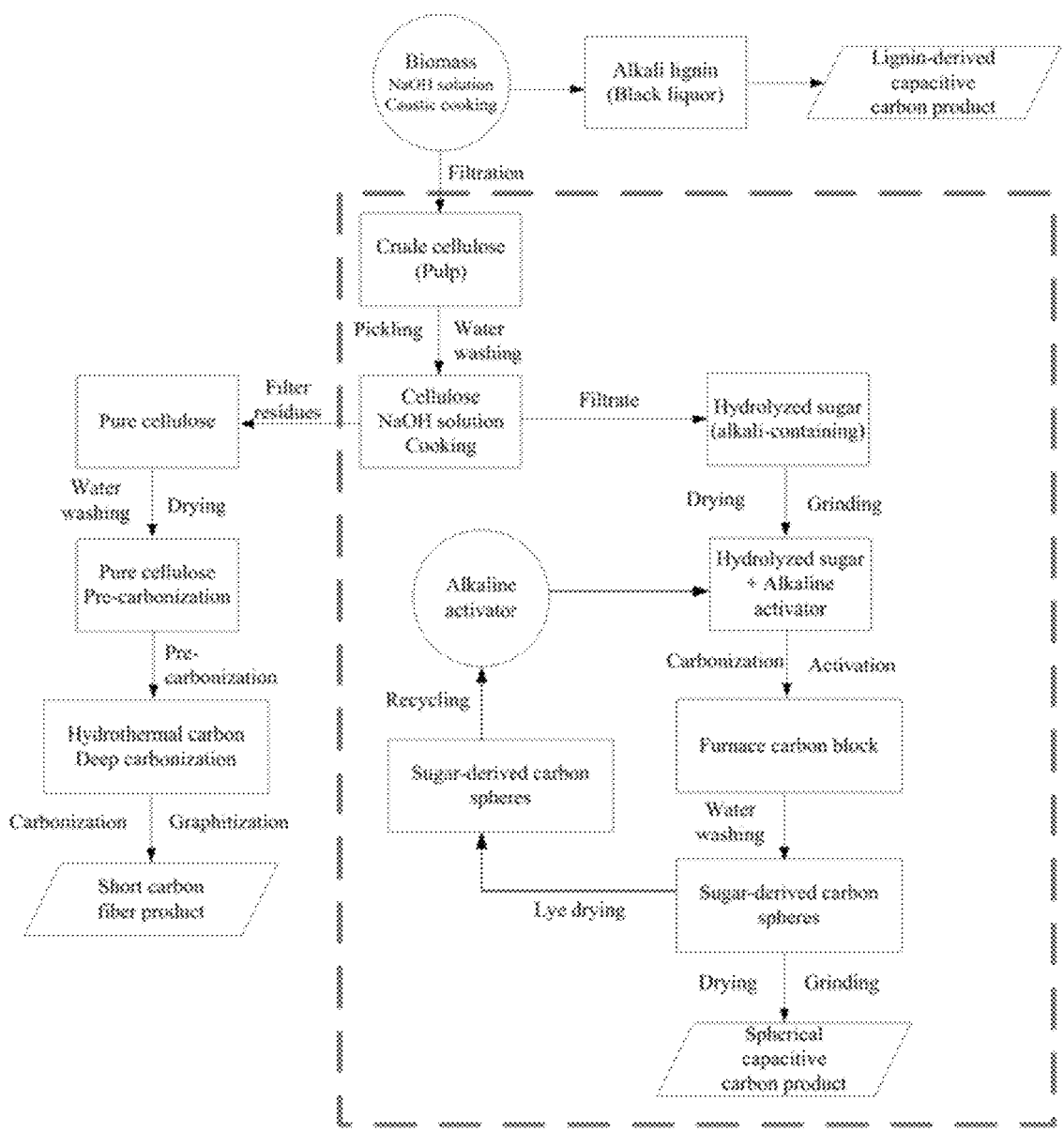
FIG. 1 is a concise block diagram of the technical route of the present disclosure.

In the pulp and paper industry, chemical bonds are broken among cellulose, lignin and hemicellulose in the raw material through the chemical hydrolysis of biomass. The main component of the separated coarse pulp is cellulose, which contains a small amount of unseparated impurities such as hemicellulose and lignin. In the present disclosure, dry pulp from paper mills or cellulose separated by organic solvent method and ionic liquid method is used as a raw material, hydrolyzed into sugar in a lye, and the sugar is sintered into spherical capacitive carbon. The technical route is shown in FIG. 1, including the following seven steps: (1) crude cellulose (pulp) pretreatment; (2) alkaline hydrolysis of cellulose; (3) separation of the cellulose from a hydrolyzed sugar liquor; (4) drying of an alkali-containing hydrolyzed sugar; (5) sintering of the spherical capacitive carbon; (6) capacitive carbon post-processing; and (7) alkali recycling. The specific operations of each step are described as follows:

(1) Crude Cellulose (Pulp) Pretreatment

The coarse pulp is ground into powder, added to a 3%-10% dilute sulfuric acid solution in a solid-liquid ratio of 1:3 to 1:5, stirred and soaked at 60-80° C. for 6-8 h. Hemicellulose is dissolved in an acid liquor, and the acid liquor and pure cellulose are separated by a centrifuge, rinsed with deionized water until neutral, and dried to obtain purified cellulose.

(2) Alkaline Hydrolysis of Cellulose

The cellulose is added to a 3%-5% NaOH solution in a solid-liquid ratio of 1:3 to 1:5, and cooked at 120-150° C. for 6-10 h to hydrolyze the cellulose until partially hydrolyzed into sugar.

(3) Separation of the Cellulose from a Hydrolyzed Sugar Liquor

A hydrolysate is subjected to solid-liquid separation in the centrifuge, and the cellulose in the centrifuge is washed with deionized water until neutral to obtain highly purified cellulose; a separated alkali-containing hydrolyzed sugar liquor is reserved for the next step.

(4) Drying of an Alkali-Containing Hydrolyzed Sugar

The alkali-containing hydrolyzed sugar liquor is poured into a stainless steel tray, dried in an oven at 115-125° C. for 6-10 h, and ground into powder; alternatively, the alkali-containing hydrolyzed sugar liquor is converted into a dry powder by spray drying.

(5) Sintering of the Spherical Capacitive Carbon

A solid alkali-containing hydrolyzed sugar obtained in step 3 was added to activator $K_2CO_3$ (or $Na_2CO_3$) and co-activator urea in a ratio of 1:(0.5-0.8):(0.3-0.6), ground, stirred, mixed evenly, put in a graphite crucible, heated to 700-800° C. in an electric furnace in an inert atmosphere for 60-90 min.

(6) Capacitive Carbon Post-Processing

The baked carbon blocks are crushed, soaked in hot water, and filtered, a filtrate is reserved, and filter residues are pickled once and washed with water several times until neutral, and dried to obtain the spherical capacitive carbon (7) Alkali Recycling A hot water soaked filtrate reserved in step 6 is put into a tray with a tetrafluoroethylene coating, evaporated and dried in a blast drying oven at 110-135° C. to recover the activator $K_2CO_3$ (or $Na_2CO_3$), which is recycled as the activator of step 5 and the hydrolyzed lye of step 2.

FIG. 1 is an operational flowchart of the technical solution of the present disclosure, where the part in the bold dashed line is the content of steps 1 to 7 of the present disclosure, and two other products, lignin-derived capacitive carbon sintered with black liquor of alkali lignin and short carbon fibers sintered with high-purity cellulose, can refer to the prior art.

The implementation methods and effects of the present disclosure will be described below with reference to specific examples.

Example 1

Figure 2:
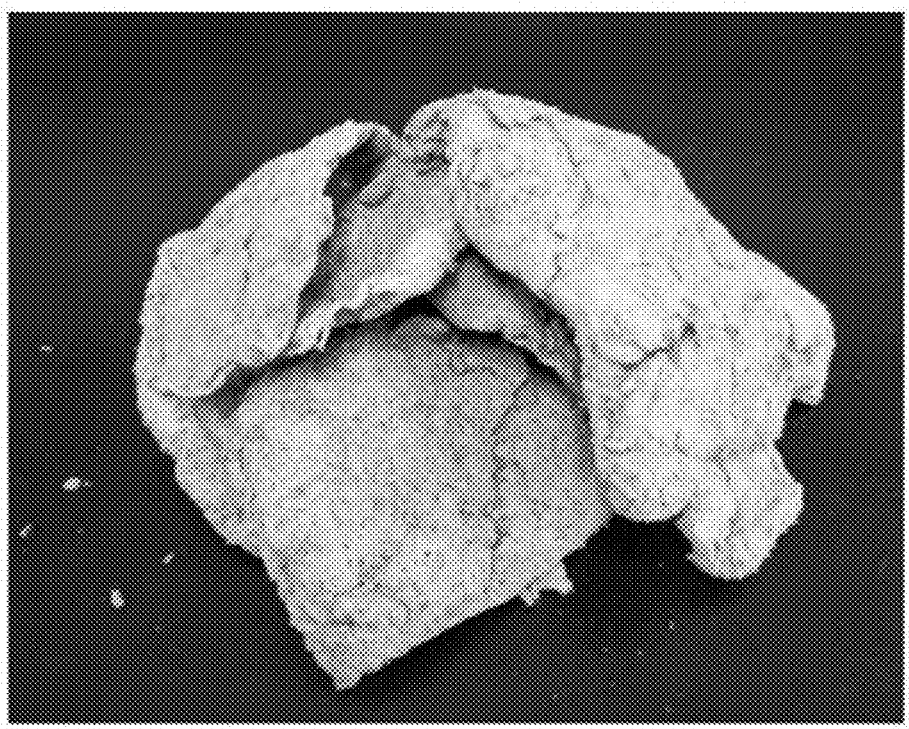
FIG. 2 is a photograph of a coarse pulp manufactured from bagasse in a paper mill of Example 1, and the coarse pulp is used as a raw material.

The spherical capacitive carbon was produced with the coarse pulp manufactured from bagasse in Nanning Paper Mill as an initial raw material (as shown in the photograph in FIG. 2). The following operational steps were as follows:

(1) Coarse Pulp Pretreatment

In a solid-liquid mass ratio of 1:5, 100 g of coarse pulp was weighed, ground into powder, put in a 5 wt % sulfuric acid solution, soaked and stirred at 80° C. for 6 h, centrifuged, and filtered; the cellulose in the centrifuge was rinsed three times with deionized water until neutral, spin-dried, and dried in an oven at 110° C. to a constant weight to obtain 92 g of dry cellulose.

(2) Alkaline Hydrolysis of Cellulose

In a solid-liquid mass ratio of 1:4, 92 g of cellulose was added to 368 g of 5 wt % NaOH solution (containing 18.4 g of NaOH), and cooked at 140° C. for 8 h to hydrolyze the cellulose, which was partially converted into sugar.

(3) Separation of the Cellulose from a Hydrolyzed Sugar Liquor

Figure 3:
FIG. 3 is a photograph of the hydrolysis of pure cellulose after pickling and water washing in a lye in Example 1.
Figure 4:
FIG. 4 is a photograph of high-purity cellulose obtained after alkaline hydrolysis of cellulose in Example 1.

A hydrolysate was subjected to solid-liquid separation in the centrifuge, and a alkali-containing hydrolyzed sugar liquor was separated (shown in FIG. 3); the cellulose in the centrifuge was washed with deionized water until neutral, spin-dried, and dried in the oven at 110° C. to a constant weight to obtain highly purified cellulose (shown in FIG. 4), which weighed 48 g.

(4) Drying of an Alkali-Containing Hydrolyzed Sugar

Figure 5:
FIG. 5 is a photograph of an alkali-containing hydrolyzed sugar obtained after alkaline hydrolysis of cellulose in Example 1.

The centrifuged alkali-containing hydrolyzed sugar liquor was put into a stainless steel tray, dried in an oven at 115° C. for 10 h, and ground into powder to obtain a solid alkali-containing hydrolyzed sugar (as shown in FIG. 5), which weighed 54 g (containing 18.4 g of NaOH).

(5) Sintering of the Spherical Capacitive Carbon

In a mass ratio of 1:0.7:0.5, 37.8 g of activator $K_2CO_3$ and 27 g of co-activator urea were added to 54 g of solid alkali-containing hydrolyzed sugar obtained in step 4, ground, stirred, mixed evenly, put into a graphite crucible, heated to 750° C. in an electric furnace in an inert atmosphere, held for 90 min, and discharged.

(6) Capacitive Carbon Post-Processing

The baked carbon blocks were crushed, soaked in hot water, and filtered, a filtrate was reserved, and filter residues were pickled once and washed with water several times until neutral, and dried to obtain the spherical capacitive carbon, which weighed 12.6 g.

(7) Alkali Recycling

Figure 8:
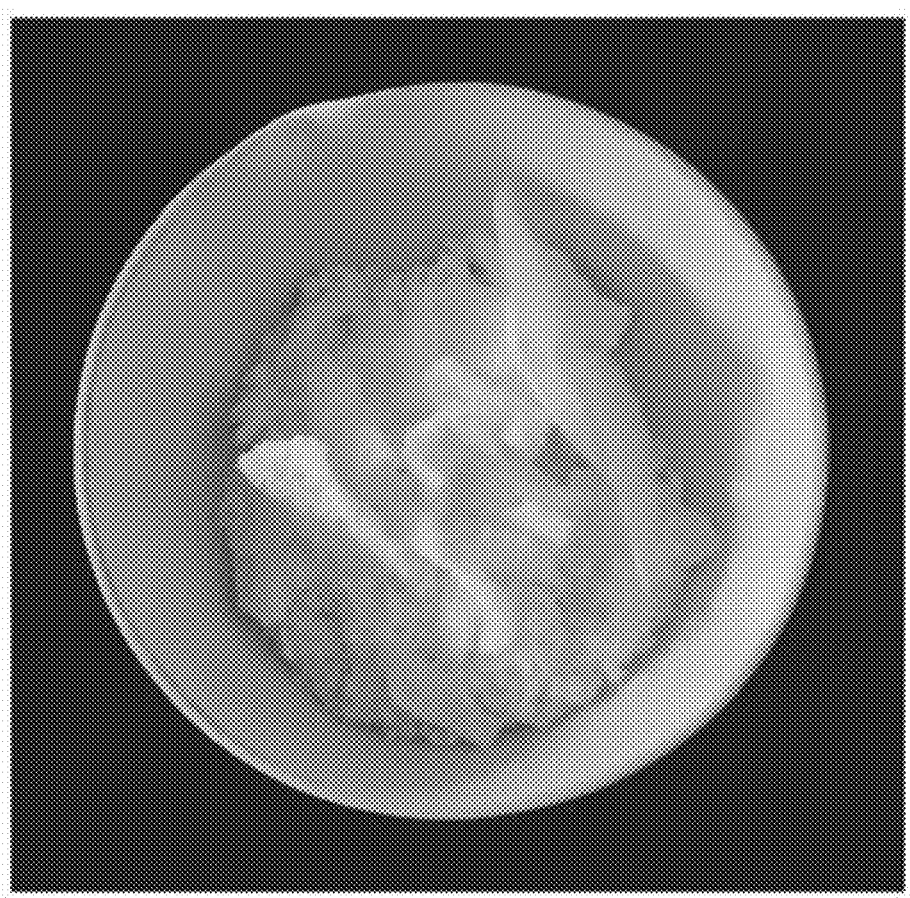
FIG. 8 is a photograph of a solid alkali activator recovered in Example 1.

The hot water soaked filtrate reserved in step 6 was put into a tray with a tetrafluoroethylene coating, evaporated and dried to a constant weight in a blast drying oven at 130° C.; the recovered activator was a mixture of $K_2CO_3$ and $Na_2CO_3$, the former was $K_2CO_3$ added in step 5, and the latter was $Na_2CO_3$ convened from NaOH used for alkaline hydrolysis in step 2. In this example, 18.4 g of NaOH and 37.8 g of $K_2CO_3$ were used, and a total of 45.7 g of the mixture of potassium carbonate and sodium carbonate was recovered (as shown in FIG. 8), which could be recycled as the activator in step 5.

Figure 6:
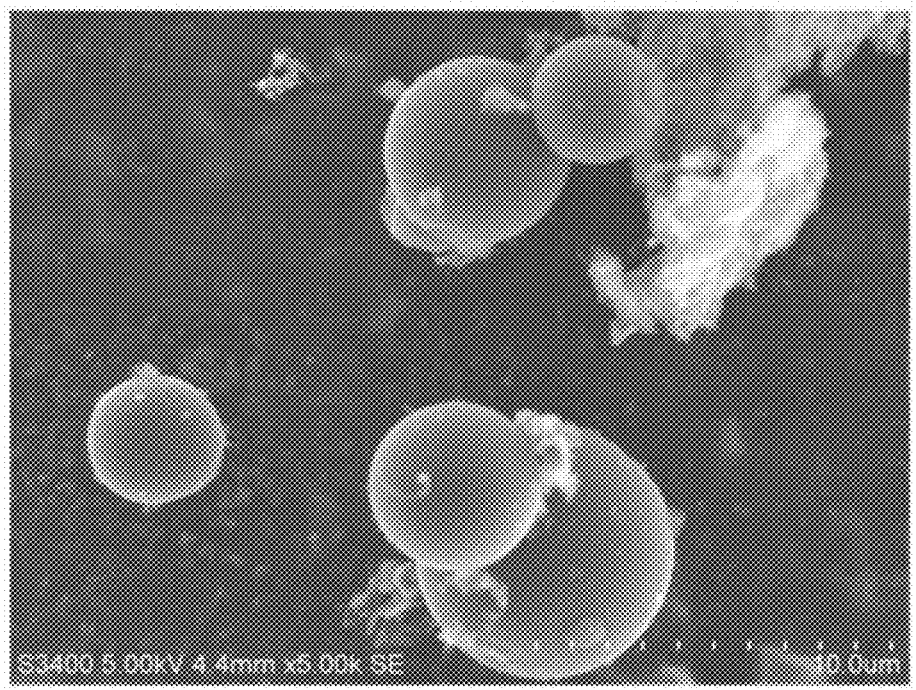
FIG. 6 is a scanning electron microscopy (SEM) image of spherical capacitive carbon prepared in Example 1.

FIG. 6 is an SEM image of the spherical capacitive carbon prepared in this example.

Figure 7:
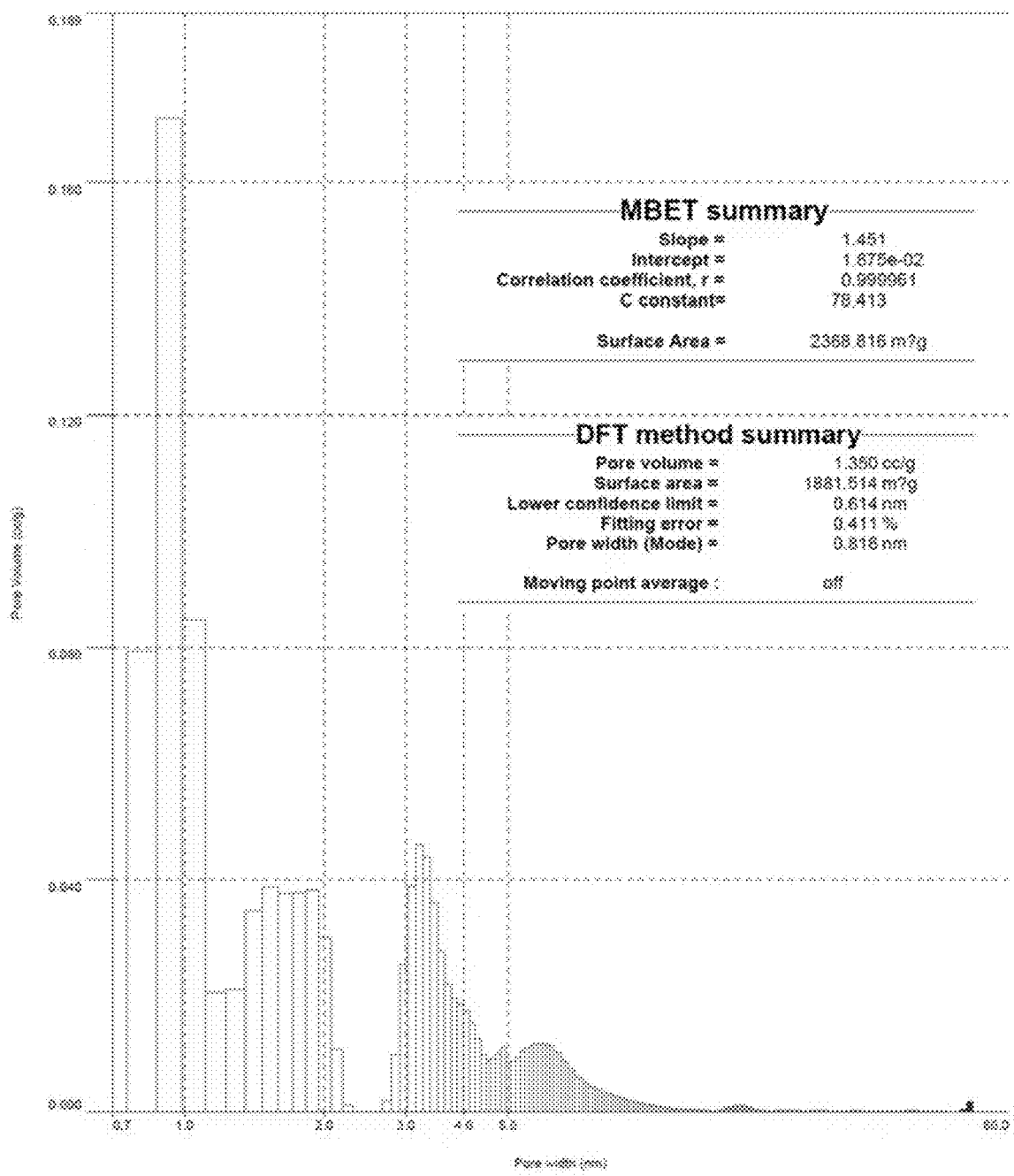
FIG. 7 is a BET test report of the specific surface of spherical capacitive carbon prepared in Example 1.

FIG. 7 is a BET test report of the specific surface of the spherical capacitive carbon prepared in this example. In this example, 48 g of high-purity cellulose and 12.6 g of spherical capacitive carbon were obtained from 100 g of coarse pulp. The products were tested by multi-point MBET; the specific surface was 2,368 $m^2/g$, and the total pore volume was 1.35 mL/g, which exceeded the highest standards of the national standard for capacitive carbon (2,000 $m^2/g$ and 0.80 mL/g, respectively).

Example 2

Example 2 was the same as Example 1. The spherical capacitive carbon and the short carbon fiber were produced with the coarse pulp manufactured from bagasse in Nanning Paper Mill as an initial raw material. The difference was that the activator used in step 5 was changed from $K_7CO_3$ to $Na_2CO_3$. The activation ability of $Na_2CO_3$ was not as good as that of $K_7CO_3$, but the cost was low. After the recycling in step 7, the activator was $Na_2CO_3$ alone, instead of a mixture of $Na_2CO_3$ and $K_2CO_3$.

(1) Coarse Pulp Pretreatment

In a solid-liquid mass ratio of 1:5, 100 g of coarse pulp was weighed, ground into powder, put in a 5 wt % sulfuric acid solution, soaked and stirred at 80° C. for 6 h, centrifuged, and filtered; the cellulose in the centrifuge was rinsed three times with deionized water until neutral, spin-dried, and dried in an oven at 110° C. to a constant weight to obtain 92 g of dry cellulose.

(2) Alkaline Hydrolysis of Cellulose

In a solid-liquid mass ratio of 1:4, 92 g of cellulose was added to 368 g of 5 wt % NaOH solution (containing 18.4 g of NaOH), and cooked at 140° C. for 8 h to hydrolyze the cellulose, which was partially converted into sugar.

(3) Separation of the Cellulose from a Hydrolyzed Sugar Liquor

A hydrolysate was subjected to solid-liquid separation in the centrifuge; the separated cellulose was washed with deionized water until neutral, spin-dried, and dried in the oven at 110° C. to a constant weight to obtain highly purified cellulose, which weighed 51 g.

(4) Drying of an Alkali-Containing Hydrolyzed Sugar Liquor

The alkali-containing hydrolyzed sugar liquor separated from the centrifuge was put into a tray, evaporated and dried to a constant weight in a blast drying oven at 120° C. to obtain a solid alkali-containing hydrolyzed sugar; the solid alkali-containing hydrolyzed sugar was ground into powder, which weighed 55 g.

(5) Sintering of the Spherical Capacitive Carbon

In a mass ratio of 1:0.7:0.5, 38.5 g of activator $Na_2CO_3$; and 27.5 g of co-activator urea were added to 55 g of solid alkali-containing hydrolyzed sugar obtained in step 4, ground, stirred, mixed evenly, put into a graphite crucible, heated to 740° C. in an electric furnace in an inert atmosphere, and held for 90 min.

(6) Capacitive Carbon Post-Processing

The baked carbon blocks were crushed, soaked in hot water, and filtered, a filtrate was reserved, and filter residues were pickled once and washed with water several times until neutral, and dried to obtain the spherical capacitive carbon, which weighed 16.6 g.

(7) Alkali Recycling

The hot water soaked filtrate reserved in step 6 was put into a tray with a tetrafluoroethylene coating, evaporated and dried to a constant weight in a blast drying oven at 130° C.; the recovered activator was a mixture of $Na_2CO_3$, and the NaOH used for alkaline hydrolysis in step 2 had been converted into $Na_2CO_3$. In this example, 18.4 g of NaOH and 38.5 g of $Na_2CO$ were used in total, and a total of 46.7 g of sodium carbonate was recovered, with a recovery rate of 82%.

In this example, 51 g of high-purity cellulose and 16.6 g of spherical capacitive carbon were obtained from 100 g of coarse pulp. The products were tested by multi-point MBET; the specific surface was 1,824 $m^2/g$, and the total pore volume was 0.822 mL/g.

Example 3

A method for hydrolyzing cellulose into sugar to produce spherical capacitive carbon was provided, including the following steps:

step 1, crude cellulose pretreatment: the crude cellulose raw material was added to a 10 wt % dilute sulfuric acid solution in a solid-liquid mass ratio of 1:3 to soak and stir for 10 h and filtered; the filter residues were rinsed with clean water until neutral and dried to obtain cellulose; the crude cellulose raw material was coarse pulp manufactured by pulp mills or cellulose extracted from biomass;

step 2, alkaline hydrolysis of cellulose: the cellulose obtained in step 1 was added into a 5 wt % aqueous NaOH solution in a solid-liquid ratio of 1:3, cooked at 120° C. for 10 h, and partially hydrolyzed into sugar, and a hydrolysate was obtained;

step 3, separation of the cellulose from a hydrolyzed sugar liquor: the hydrolysate obtained in step 2 was subjected to solid-liquid separation, and filter residues were washed with water and dried to obtain purified cellulose;

step 4, drying of an alkali-containing hydrolyzed sugar: a filtrate separated in step 3 was used as an alkali-containing hydrolyzed sugar liquor, and the alkali-containing hydrolyzed sugar liquor was evaporated and dried to obtain the alkali-containing hydrolyzed sugar;

step 5, sintering of spherical capacitive carbon: the dried alkali-containing hydrolyzed sugar was supplemented with activator potassium carbonate/sodium carbonate and co-activator urea, where the alkali-containing hydrolyzed sugar, the activator and the co-activator had a mass ratio of 1:0.5:0.3; all materials were ground, stirred and mixed evenly, the resulting mixture was heated to 700° C. in an inert atmosphere, and carbonized-activated for 80 min to form spherical capacitive carbon;

step 6, capacitive carbon post-processing: the spherical capacitive carbon agglomerate was crushed, soaked in hot water, and filtered, a filtrate was reserved, and filter residues were pickled and washed with water, dried to obtain a finished product of spherical capacitive carbon;

step 7, alkali recycling: a hot water soaked filtrate in the capacitive carbon post-processing in step 6 was dried, the alkali was recovered, and the alkali used in the alkaline hydrolysis of cellulose in step 2 and the activator in the sintering of spherical capacitive carbon in step 5 were recycled.

Example 4

A method for hydrolyzing cellulose into sugar to produce spherical capacitive carbon was provided, including the following steps:

step 1, crude cellulose pretreatment: the crude cellulose raw material was added to a 4 wt % dilute sulfuric acid solution in a solid-liquid mass ratio of 1:4 to soak and stir for 8 h and filtered; the filter residues were rinsed with clean water until neutral and dried to obtain cellulose; the crude cellulose raw material was coarse pulp manufactured by pulp mills or cellulose extracted from biomass;

step 2, alkaline hydrolysis of cellulose: the cellulose obtained in step 1 was added into a 3 wt % aqueous NaOH solution in a solid-liquid ratio of 1:5, cooked at 150° C. for 6 h, and partially hydrolyzed into sugar, and a hydrolysate was obtained;

step 3, separation of the cellulose from a hydrolyzed sugar liquor: the hydrolysate obtained in step 2 was subjected to solid-liquid separation, and filter residues were washed with water and dried to obtain purified cellulose;

step 4, drying of an alkali-containing hydrolyzed sugar: a filtrate separated in step 3 was used as an alkali-containing hydrolyzed sugar liquor, and the alkali-containing hydrolyzed sugar liquor was evaporated and dried to obtain the alkali-containing hydrolyzed sugar;

step 5, sintering of spherical capacitive carbon: the dried alkali-containing hydrolyzed sugar was supplemented with activator potassium carbonate/sodium carbonate and co-activator urea, where the alkali-containing hydrolyzed sugar, the activator and the co-activator had a mass ratio of 1:0.8:0.6; all materials were ground, stirred and mixed evenly, the resulting mixture was heated to 800° C. in an inert atmosphere, and carbonized-activated for 60 min to form spherical capacitive carbon;

step 6, capacitive carbon post-processing: the spherical capacitive carbon agglomerate was crushed, soaked in hot water, and filtered, a filtrate was reserved, and filter residues were pickled and washed with water, dried to obtain a finished product of spherical capacitive carbon;

step 7, alkali recycling: a hot water soaked filtrate in the capacitive carbon post-processing in step 6 was dried, the alkali was recovered, and the alkali used in the alkaline hydrolysis of cellulose in step 2 and the activator in the sintering of spherical capacitive carbon in step 5 were recycled.

Although the present disclosure has been disclosed above with preferred examples, they are not intended to limit the present disclosure. Any person skilled in the art can make some modifications and improvements without departing from the spirit and scope of the present disclosure. Therefore, the protection scope of the present disclosure should be subject to that defined by the claims.

What is claimed is:

1. A method for hydrolyzing cellulose into sugar to produce spherical capacitive carbon, comprising the following steps:

step 1, crude cellulose pretreatment: soaking and stirring a crude cellulose raw material in a dilute sulfuric acid solution, filtering, rinsing filter residues with clean water until neutral, and drying the filter residues to obtain cellulose;

step 2, alkaline hydrolysis of cellulose: adding the cellulose obtained in step 1 into a lye, cooking the cellulose at 120-150° C. for 6-10 h, and partly hydrolyzing the cellulose into sugar;

step 3, separation of the cellulose from a hydrolyzed sugar liquor: subjecting a hydrolysate obtained in step 2 to solid-liquid separation, washing filter residues with water and drying to obtain purified cellulose;

step 4, drying of an alkali-containing hydrolyzed sugar: using a filtrate separated in step 3 as an alkali-containing hydrolyzed sugar liquor, and evaporating and drying the alkali-containing hydrolyzed sugar liquor to obtain the alkali-containing hydrolyzed sugar;

step 5, sintering of spherical capacitive carbon: supplementing the alkali-containing hydrolyzed sugar with an activator and a co-activator, grinding, stirring and mixing evenly, heating a resulting mixture to 700-800° C. in an inert atmosphere, and carbonizing-activating for 60-90 min to form a spherical capacitive carbon agglomerate;

step 6, capacitive carbon post-processing: crushing the spherical capacitive carbon agglomerate, soaking in hot water, filtering, reserving a filtrate, pickling and washing filter residues with water, drying and grinding to obtain a finished product of spherical capacitive carbon; and step 7, alkali recycling: drying a hot water soaked filtrate in the capacitive carbon post-processing in step 6, recovering the alkali, and recycling the alkali used in the alkaline hydrolysis of cellulose in step 2 and/or the activator in the sintering of spherical capacitive carbon in step 5.

2. The method for hydrolyzing cellulose into sugar to produce spherical capacitive carbon according to claim 1, wherein in step 1, the crude cellulose raw material is coarse pulp produced by a pulp mill or cellulose extracted from biomass by other methods.

3. The method for hydrolyzing cellulose into sugar to produce spherical capacitive carbon according to claim 1, wherein step 1 comprises the following operations: adding the crude cellulose raw material to a 3-10 wt % dilute sulfuric acid solution in a solid-liquid mass ratio of 1:(3-5) to soak and stir for 6-10 h, filtering, rinsing the filter residues with clean water until neutral, and drying to obtain the cellulose.

4. The method for hydrolyzing cellulose into sugar to produce spherical capacitive carbon according to claim 1, wherein in step 2, the cellulose is added to a 3-5 wt % lye in a solid-liquid ratio of 1:(3-5).

5. The method for hydrolyzing cellulose into sugar to produce spherical capacitive carbon according to claim 4, wherein in step 2, the lye is an aqueous NaOH solution.

6. The method for hydrolyzing cellulose into sugar to produce spherical capacitive carbon according to claim 1, wherein in step 5, the alkali-containing hydrolyzed sugar, the activator, and the co-activator have a mass ratio of 1:(0.5-0.8):(0.3-0.6).

7. The method for hydrolyzing cellulose into sugar to produce spherical capacitive carbon according to claim 6, wherein the activator comprises alkaline potassium and sodium salts, and the co-activator comprises urea.

8. The method for hydrolyzing cellulose into sugar to produce spherical capacitive carbon according to claim 7, wherein the potassium salt is potassium carbonate, and the sodium salt is sodium carbonate.

9. The method for hydrolyzing cellulose into sugar to produce spherical capacitive carbon according to claim 1, wherein in step 2, the lye is an aqueous NaOH solution.

* * * * *